(12) United States Patent
Baumgardner et al.

(10) Patent No.: US 7,714,605 B2
(45) Date of Patent: May 11, 2010

(54) ARBITRARY QUANTUM OPERATIONS WITH A COMMON COUPLED RESONATOR

(75) Inventors: James E. Baumgardner, Odenton, MD (US); Aaron A. Pesetski, Gambrills, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 0 days.

(21) Appl. No.: 12/355,562

(22) Filed: Jan. 16, 2009

(65) Prior Publication Data

US 2009/0206871 A1    Aug. 20, 2009

Related U.S. Application Data

(63) Continuation of application No. 11/833,902, filed on Aug. 3, 2007, now Pat. No. 7,498,832.

(51) Int. Cl.
*H03K 19/195* (2006.01)

(52) U.S. Cl. .................. 326/7; 326/3; 326/5; 326/6

(58) Field of Classification Search .................. 326/1–7
See application file for complete search history.

(56) References Cited

U.S. PATENT DOCUMENTS

| | | | |
|---|---|---|---|
| 3,341,380 A | 9/1967 | Mets et al. | |
| 4,117,354 A | 9/1978 | Geewala | |
| 4,916,335 A | 4/1990 | Goto et al. | |
| 5,099,152 A | 3/1992 | Suzuki | |
| 5,309,038 A | 5/1994 | Harada et al. | |
| 6,188,236 B1 | 2/2001 | Wikborg | |
| 6,507,234 B1 | 1/2003 | Johnson et al. | |
| 6,518,786 B2 | 2/2003 | Herr | |
| 6,549,059 B1 | 4/2003 | Johnson | |
| 6,617,643 B1 | 9/2003 | Goodwin-Johansson | |
| 6,724,216 B2 | 4/2004 | Suzuki et al. | |
| 6,750,794 B1 | 6/2004 | Durand et al. | |
| 6,865,639 B2 | 3/2005 | Herr | |
| 6,960,780 B2 | 11/2005 | Blais et al. | |

(Continued)

FOREIGN PATENT DOCUMENTS

EP        0467104        1/1992

(Continued)

OTHER PUBLICATIONS

Berns et al., "Coherent Quasiclassical Dynamics of a Persistent Current Qubit", *Physical Review Letters APS USA*, vol. 97, No. 15, pp. 150502, Oct. 13, 2006.

(Continued)

*Primary Examiner*—Anh Q Tran
(74) *Attorney, Agent, or Firm*—Tarolli, Sundheim, Covell & Tummino LLP

(57) ABSTRACT

A quantum logic gate is formed from multiple qubits coupled to a common resonator, wherein quantum states in the qubits are transferred to the resonator by transitioning a classical control parameter between control points at a selected one of slow and fast transition speeds, relative to the characteristic energy of the coupling, whereby a slow transition speed exchanges energy states of a qubit and the resonator, and a fast transition speed preserves the energy states of a qubit and the resonator.

18 Claims, 10 Drawing Sheets

U.S. PATENT DOCUMENTS

| | | | |
|---|---|---|---|
| 7,498,832 | B2 | 3/2009 | Baumgardner et al. |
| 2002/0063643 | A1 | 5/2002 | Smith et al. |
| 2002/0190381 | A1 | 12/2002 | Herr et al. |
| 2003/0011398 | A1 | 1/2003 | Herr |
| 2003/0016069 | A1 | 1/2003 | Furuta et al. |
| 2003/0039138 | A1 | 2/2003 | Herr |
| 2003/0040440 | A1 | 2/2003 | Wire et al. |
| 2003/0115401 | A1 | 6/2003 | Herr |
| 2003/0183935 | A1 | 10/2003 | Herr et al. |
| 2004/0120444 | A1 | 6/2004 | Herr |
| 2004/0201099 | A1 | 10/2004 | Herr |
| 2004/0201400 | A1 | 10/2004 | Herr |
| 2005/0001209 | A1 | 1/2005 | Hilton et al. |
| 2005/0023518 | A1 | 2/2005 | Herr |
| 2005/0110106 | A1 | 5/2005 | Goto et al. |
| 2005/0224784 | A1* | 10/2005 | Amin et al. .................. 257/14 |
| 2006/0091490 | A1 | 5/2006 | Chen et al. |

FOREIGN PATENT DOCUMENTS

| | | |
|---|---|---|
| WO | WO 2005/093649 | 10/2005 |
| WO | PCT/US2008/072017 | 8/2008 |
| WO | PCT/US2008/050864 | 11/2008 |

OTHER PUBLICATIONS

Garanin et al., Effects of nonlinear sweep in the Landau-Zener-Stueckelberg effect, *Physical Review B*, vol. 66, No. 17, pp. 174438-1-174438-11, Nov. 1, 2002.

Koch et al., A NRZ—Output Amplifier for RSFQ Circuits, , *IEEE Transaction on Applied Superconductivity*, vol. 9, No. 2, pp. 3549-3552, Jun. 1999.

Ortlepp et al., "Experimental Analysis of a New Generation of Compact Josephson-Inductance-Based RSFQ Circuits", *11th International Superconductive Electronics Conference*, 3 pages, Jun. 10, 2007.

Wulf et al., Dressed States of Josephson Phase Qubit Coupled to an LC Circuit, *IEEE Transaction on Applied Superconductivity IEEE USA*, vol. 15, No. 2, pp. 856-859, Jun. 2, 2005.

Novel Very High IE Structures Based on the Directed BBHE Mechanism for Ultralow-Power Flash Memories, Gopalakrishnan et al., *IEEE Electron Device Letters*, vol. 26, No. 3, pp. 212-215, Mar. 2005.

80nm Self-Aligned Complementary I-MOS Using Double Sidewall Spacer and Elevated Drain Structure and Its Applicability to Amplifiers with High Linearity, Choi et al., *Electron Devices Meeting*, pp. 8.5.1-8.5.4, Dec. 2004.

Novel Tunneling Devices with Multi-Functionality, *Japanese Journal of Applied Physics* vol. 46, No. 4B, pp. 2632-2625, Apr. 2007.

A Novel CMOS Compatible L-Shaped Impact-Ionization MOS (LI-MOS) Transistor, Eng-Huat Toh et al., *International Electron Devices Meeting*, pp. 951-954, Dec. 2005.

Effects of Nonlinear Sweep in the Landau-Zener-Stueckelberg Effect, Garanin D A et al., *Physical Review B*, vol. 66 No. 17, pp. 174438-1-174438-11, Nov. 2002.

Dressed States of Josephson Phase Qubit Coupled to an LC Circuit, Wulf et al., *IEEE Transactions of Applied Superconductivity*, vol. 15, No. 2, pp. 856-859, Jun. 2005.

Coherent Quasiclassical Dynamics of a Persistent Current Qubit, Bern et al., *Phyiscal Review Letters*, vol. 97 No. 15, Oct. 2006.

Th. Ortlepp et al.; "Experimental Analysis of a new Generation of compact Josephson-inductance-based RSFQ Circuits"; Authors are with the Institute of Information Technology, University of Technology, Ilmenau, Germany;2 pages, 2008.

A NRZ—Output Amplifier for RSFQ Circuits, Koch et al., IEEE Transaction on Applied Superconductivity, vol. 9, No. 2, pp. 3549-3552, Jun. 1999.

U.S. Appl. No. 11/654,632, filed Jan. 18, 2007, Herr.

\* cited by examiner

| Point 1 | Point 2 |
|---------|---------|
| \|0,0⟩  | \|0,0⟩  |
| \|1,0⟩  | \|0,1⟩  |
| \|0,1⟩  | \|0,2⟩  |
| \|1,1⟩  | \|0,3⟩  |

| Point 1 | Point 2 |
|---------|---------|
| |0,0>   | |0,0>   |
| |1,0>   | |0,1>   |
| |0,1>   | |0,3>   |
| |1,1>   | |0,2>   |

| Initial | qA: 1 → 2 | qB: 1 → 2 | qB: 2 → 1 | qA: 2 → 1 |
|---------|-----------|-----------|-----------|-----------|
| I00>I0> | I00>I0> | I00>I0> | I00>I0> | I00>I0> |
| I01>I0> | I01>I0> | I00>I1> | I01>I0> | I01>I0> |
| I10>I0> | I00>I1> | I00>I2> | I00>I1> | I10>I0> |
| I11>I0> | I01>I1> | I00>I3> | I01>I1> | I11>I0> |

| Initial | qA: 1 → 2 | qB: 1 → 2 | qA: 2 → 1 | qB: 2 → 1 |
|---|---|---|---|---|
| \|00>\|0> | \|00>\|0> | \|00>\|0> | \|00>\|0> | \|00>\|0> |
| \|01>\|0> | \|01>\|0> | \|00>\|1> | \|10>\|0> | \|10>\|0> |
| \|10>\|0> | \|00>\|1> | \|00>\|2> | \|00>\|1> | \|01>\|0> |
| \|11>\|0> | \|01>\|1> | \|00>\|3> | \|10>\|1> | \|11>\|0> |

Control A

Control B

| Initial | qA: 1 → 2 | qB Jump | qB: 2 → 1 | qA: 2 → 1 |
|---------|-----------|---------|-----------|-----------|
| \|00> \|0> | \|00> \|0> | \|00> \|0> | \|00> \|0> | \|00> \|0> |
| \|01> \|0> | \|01> \|0> | \|00> \|1> | \|01> \|0> | \|01> \|0> |
| \|10> \|0> | \|00> \|1> | \|00> \|3> | \|01> \|1> | \|11> \|0> |
| \|11> \|0> | \|01> \|1> | \|00> \|2> | \|00> \|1> | \|10> \|0> |

US 7,714,605 B2

ARBITRARY QUANTUM OPERATIONS WITH A COMMON COUPLED RESONATOR

RELATED APPLICATIONS

The instant application is a continuation application and claims the priority benefit of co-pending application Ser. No. 11/833,902, filed Aug. 3, 2007, by the instant inventors, the entirety of which is incorporated herein by reference. This application is related to the U.S. patent application Ser. No. 11/654,632 filed Jan. 18, 2007, which is fully incorporated herein by reference.

BACKGROUND

1. Field

The invention relates generally to quantum computers. More specifically, the invention relates to generating fundamental logical operations in quantum computers.

2. Background

A classical computer operates by processing binary bits of information that change state according to the laws of classical physics. These information bits can be modified by using simple logic gates such as AND and OR gates. The binary bits are physically created by a high or a low energy level occurring at the output of the logic gate to represent either a logical one (e.g. high voltage) or a logical zero (e.g. low voltage). A classical algorithm, such as one that multiplies two integers, can be decomposed into a long string of these simple logic gates. A set of such gates is said to be complete if all possible algorithms can be generated from only that set of gates. For example, the classical NAND gate by itself forms a complete set.

Like a classical computer, a quantum computer also has bits and gates. But instead of using logical ones and zeroes, a quantum bit ("qubit") uses quantum mechanics to occupy both possibilities simultaneously. This ability means that a quantum computer can solve a large class of problems with exponentially greater efficiency than that of a classical computer.

It is widely known that a combination of single-qubit operations with a two-qubit controlled-not (CNOT) gate forms a complete set for quantum computation. It has been demonstrated that some single qubit operations can be performed by coupling the qubit to a resonator. An objective of ongoing research in this field is to develop a more efficient means of achieving arbitrary qubit operations.

SUMMARY

The present invention provides a technique for creating any arbitrary quantum operation by controlling energy splitting in a qubit coupled to a resonator in a way that mimics a classical digital control. In one embodiment, a quantum circuit or quantum gate is formed from multiple qubits coupled to a common resonator, with each qubit coupled to a classical control. Qubits may be formed from any quantum circuit technology, such as Josephson junction technology, in which energy splitting is tunable by a classical control parameter such as a flux bias. Quantum states in the qubits are transferred to the resonator by transitioning the classical control parameter between control points at a selected one of slow and fast transition speeds relative to the characteristic energy of the coupling. A slow transition speed relative to the characteristic energy exchanges energy states of a qubit and the resonator, and a fast transition speed relative to the characteristic energy preserves the energy states of a qubit and the resonator. The control is digital in the sense that low precision, in both control point definition and in transition speed between control points, yields a high degree of accuracy in the response of the quantum gate.

In a quantum circuit having multiple qubits, methods for creating a quantum logic gate are also disclosed. In one embodiment, multiple qubits are coupled to a common resonator having a plurality of distinct energy levels. In one or more steps, energy splitting in the multiple qubits is adjusted using classical control parameters, each qubit corresponding uniquely to a classical control parameter, and each classical control parameter adjustable between first and second control points. Logical operations are achieved through sequences of adjustments of the classical control parameters, where quantum states between a qubit and the resonator may be exchanged or preserved according to adjustment speed of the classical control parameter between the first and second control points.

In one embodiment of the invention, a quantum gate is achieved for performing a CNOT operation. The quantum gate includes a resonator having at least four quantum states, at least one qubit coupled to the resonator by a coupling having a characteristic energy, and at least one classical control parameter coupled to adjust a quantum state of the at least one qubit by transitioning between control points, whereby transitioning the classical control parameter between the control points slowly relative to the characteristic energy of the coupling causes a first quantum state change in the resonator, and transitioning the classical control parameter between the control points rapidly relative to the characteristic energy of the coupling causes a second quantum state change in the resonator that differs from the first quantum state change.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

The present invention provides a novel technique for creating fundamental logic gates in a quantum circuit for performing any type of logical operation. This technique allows the logic gates, or quantum gates, to be controlled in a highly accurate manner by classical digital control. The control is "digital" in the sense that the starting point, ending point, and speed of the control signal do not require high precision to achieve a high degree of accuracy in the response of the quantum gates. By eliminating the need for high precision electronic controls, the invention significantly reduces the cost and complexity of quantum computing and makes possible the engineering of a quantum computer.

Figure 1A:
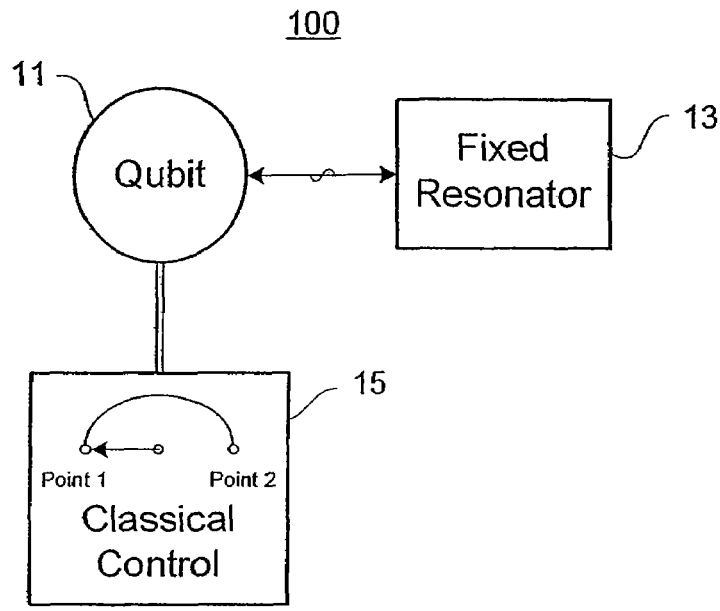
FIG. 1A is a basic block diagram of a quantum circuit according to the invention showing a single qubit with classical control and coupled to a resonator.

FIG. 1A shows a basic block diagram of a quantum circuit or quantum gate 100 according to the invention. Circuit 100 includes a qubit 11 coupled to a fixed resonator 13, and a classical digital control 15 coupled to qubit 11. The coupling between qubit 11 and control 15 is arranged so that the quantum state of qubit 11 may be changed in response to adjustment of a classical control parameter. That is, adjustment of control 15 from Point 1 to Point 2 provides a classical digital control for quantum gate 100. The term "classical" implies that the manner of control behaves generally according to the laws of classical physics.

Figure 1B:
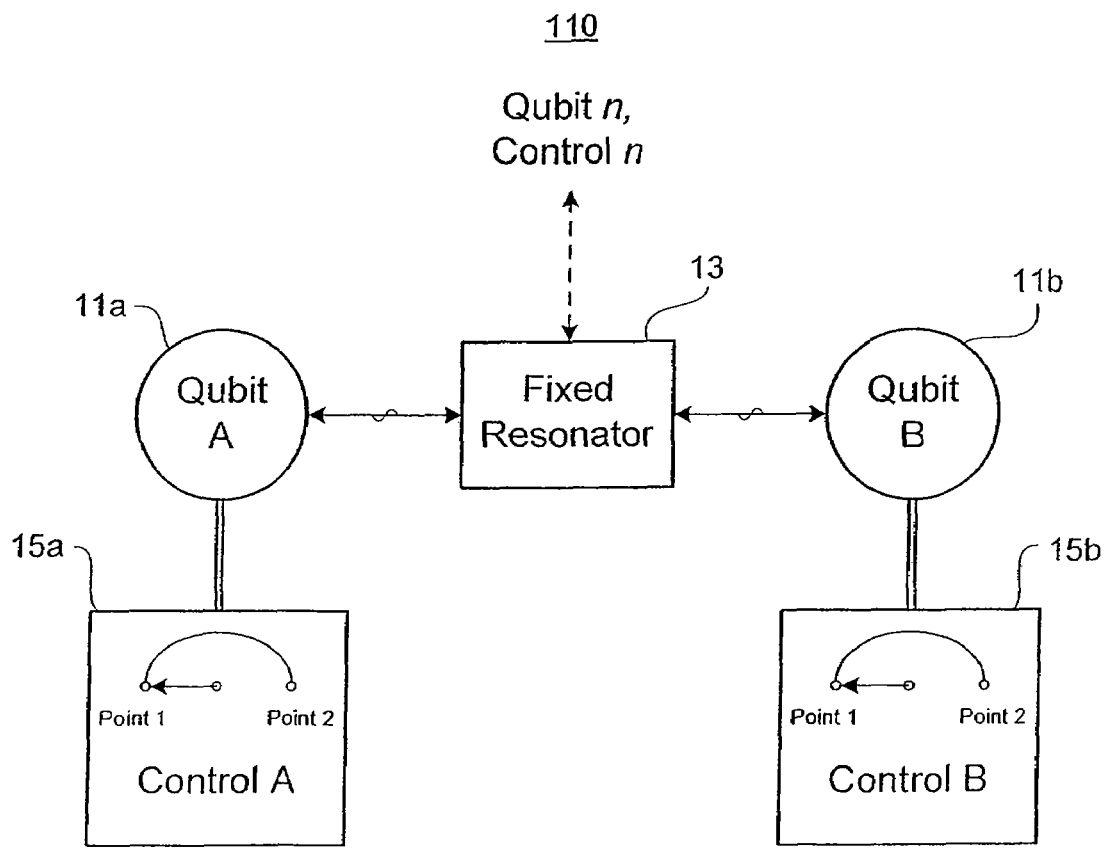
FIG. 1B is a general block diagram of a quantum circuit according to the invention showing an arbitrary number of n qubits, each with classical control and coupled to a common resonator, for performing an arbitrary logical operation.

FIG. 1B shows a general block diagram of a quantum circuit 110 according to the invention, which includes an arbitrary number of n qubits for performing an arbitrary logical operation. All qubits in the circuit are coupled to a common fixed resonator 13. In addition, each qubit is coupled to, and is controllable by, a corresponding classical digital control in the same manner as in circuit 100. For example, qubit 11a corresponds to control 15a, qubit 11b corresponds to control 15b, and each of an arbitrary number of n qubits corresponds uniquely to one of n controls. In the following discussions, for purposes of illustration only, the invention is described in terms of two qubits, denoted qA and qB, coupled to a common resonator r. It shall be understood that various embodiments of the invention may employ much larger numbers and combinations of qubits.

The circuits of FIGS. 1A and 1B have general application in quantum computing, and may be implemented using any quantum circuit technology in which energy splitting is tunable. For example, a physical implementation of any of qubits 11, 11a, 11b and 11n may be a Josephson junction, a quantum dot, a SQUID (superconducting quantum interference device), a Cooper pair box, or an ion trap. The choice of resonator 13 is likewise not restricted to a particular technology. A resonator 13 that may be employed in accordance with the basic principles of the invention may be any system having at least two quantum states. Examples of a resonator that satisfy this requirement include, but are not limited to, a transmission line, a resonant cavity, and another qubit. In addition, the coupling of a qubit to a resonator may be accomplished according to the invention using any of various means of physical coupling. For example, the qubit-resonator coupling may be a mechanical coupling by means of an electrical conductor. Alternatively, the qubit-resonator coupling may include, without limitation, capacitive, inductive, magnetic, nuclear, and optical coupling, or any combination of the foregoing.

To best introduce the operating principles of the invention, it is instructive to present the concept of an "avoided crossing" of energy states. This concept is illustrated in the context of the energy diagram of FIG. 2A, which shows energy states that cross, and the energy diagram of FIG. 2B, which shows an avoided crossing of energy states.

Figure 2A:
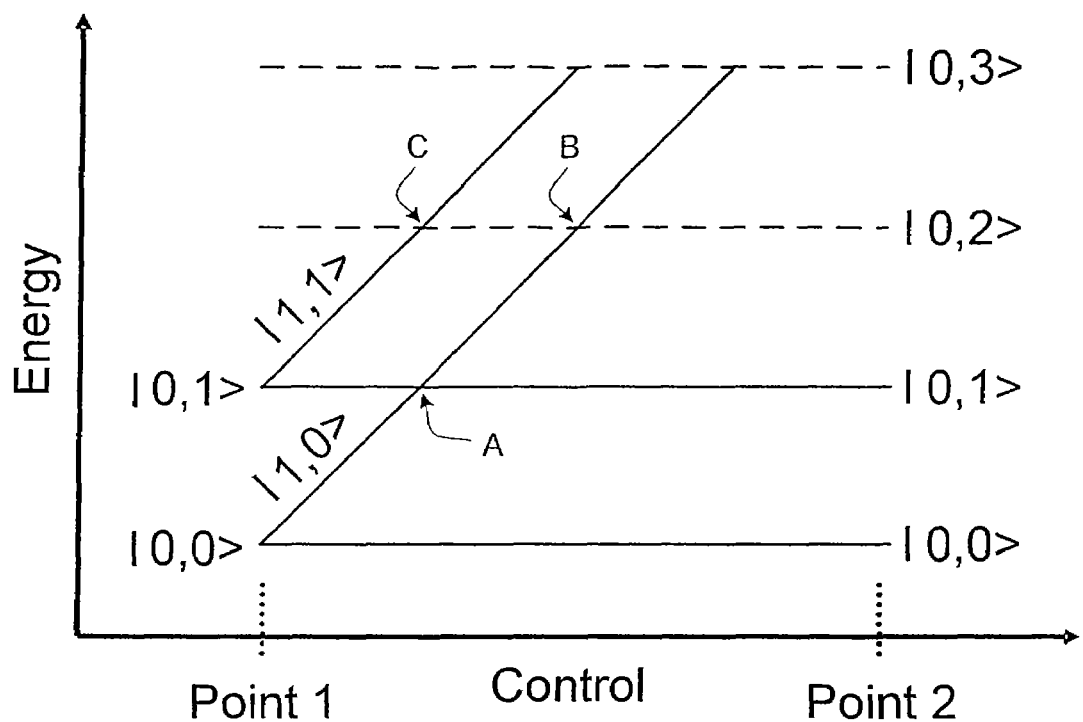
FIG. 2A is an energy diagram for a system having an uncoupled qubit and resonator, showing independent state changes in response to a classical control parameter.

FIG. 2A shows energy states in a system having an uncoupled qubit and resonator. This is an ideal case shown only for the purposes of illustration. In reality, some amount of coupling will exist between the qubit and resonator. Accordingly, in the ideal case shown, changes in energy state of the qubit are independent of changes in energy state of the resonator.

In this diagram and in the energy diagrams that follow, energy states are labeled using the standard Dirac or "bra-ket" notation, wherein the state $|q, r\rangle$ represents the qubit in state $|q\rangle$ and the resonator in state $|r\rangle$. For example, the notation $|1,0\rangle$ may represent a system having one photon in the qubit and zero photons in the resonator. The vertical axis of the energy diagram represents energy of the given state, relative to the ground energy state. The horizontal axis of the energy diagram represents the control level of the classical control parameter used to adjust the energy state in the qubit. Throughout the disclosure, the term "energy state" refers to a quantum state having a well-defined energy, i.e. the probability of the system having that particular energy closely approaches one hundred percent. The term "quantum state" refers to a complete description of the system, i.e., a function that describes a probability distribution that the system is in a particular scalar/vector state.

In FIG. 2A, because there is no coupling between the qubit and resonator, energy levels simply add together, and the energy states can cross. For example, with the qubit and resonator initially at state $|1,0\rangle$, as the classical control parameter adjusts from Point 1 to Point 2, the energy levels in the uncoupled qubit and resonator remain in the $|1,0\rangle$ state, effectively "crossing" the energy levels at states $|0,1\rangle$ and $|0,2\rangle$. In the diagram, these crossing points are denoted A and B, respectively. Similarly, with the qubit and resonator initially at state $|1,1\rangle$, as the classical control parameter adjusts from Point 1 to Point 2, the energy levels in the uncoupled qubit and resonator remain in the $|1,1\rangle$ state, effectively crossing the energy level at state $|0,2\rangle$. This crossing point is denoted with the letter C.

The classical control parameter tunes the energy levels in the qubit by adjusting between at least two control points, which are labeled as Point 1 and Point 2. For example, in an embodiment that employs a superconducting flux qubit, the classical control parameter may be a flux bias. In an embodiment employing a superconducting phase qubit, the classical control parameter may be a DC current bias. According to the invention, high precision is not required when adjusting the classical control parameter between Point 1 to Point 2. In this sense, the classical control parameter may be considered a digital control.

Figure 2B:
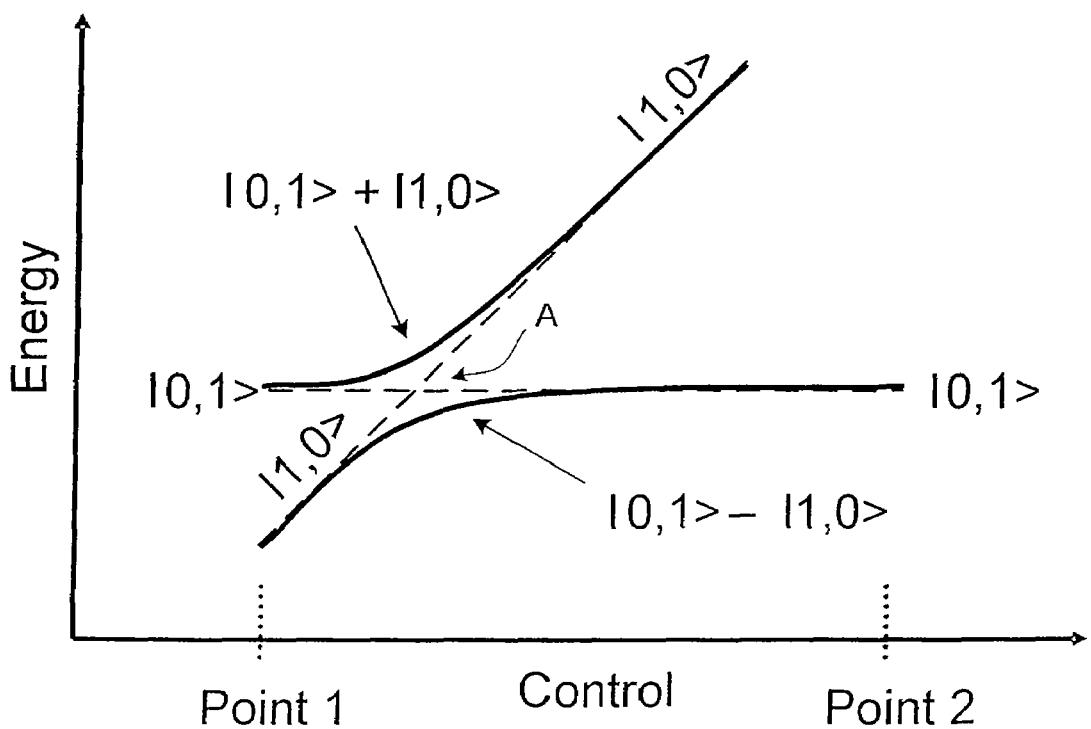
FIG. 2B is an energy diagram for a system having a qubit coupled to a resonator, illustrating the concept of avoided crossing.

FIG. 2B shows energy states in a system having some degree of coupling between the qubit and the resonator. Of particular importance is the behavior of qubit and resonator energy states as the qubit is tuned to a level that would correspond to a crossing point such as A, B or C in the uncoupled case. For example, with qubit and resonator in an initial state of |1,0>, as the classical control parameter is swept slowly from Point 1 to a point corresponding to crossing A, the effect of the coupling dominates, and the crossing at point A is avoided. This results from a quantum mechanical effect whereby two systems that are coupled together and that have the same energy will not cross energy lines. Thus, as the classical control parameter sweeps to Point 2, the state of the system tracks the energy line labeled |0,1>−|1,0>. This energy line asymptotically approaches the energy line |0,1> of the uncoupled case, which is depicted in FIG. 2B as a dashed line. At point 2, the system assumes the state |0,1>. Provided that the sweep of the classical control parameter is adiabatic, the end result is a change of state from |1,0> to |0,1>, whereby a photon has been taken from the qubit and transferred to the resonator. In essence, the information has been swapped.

Similarly, as shown in FIG. 2B, with the system in an initial state of |0,1> at Point 1, an adiabatic sweep of the classical control parameter toward Point 2 will track the energy line labeled |0,1>+|1,0>. Again, the crossing at A is avoided, and the energy line asymptotically approaches energy line |1,0> of the uncoupled case, depicted in FIG. 2B as a dashed line. At Point 2, the system achieves the state |1,0>, effectively swapping information between qubit and resonator.

As described in the foregoing paragraphs, the exchange of information between qubit and resonator occurs when there is an adiabatic sweep of the classical control parameter. This means that the parameter is adjusted very slowly relative to all other relevant time scales. For example, the relevant time scales may be determined according to the coupling strength or according to the size of the energy splitting. In other words, an adiabatic sweep is one that is sufficiently slow to allow the state of the system to follow the energy line in which it started, without allowing it to cross another energy line.

Figure 3A:
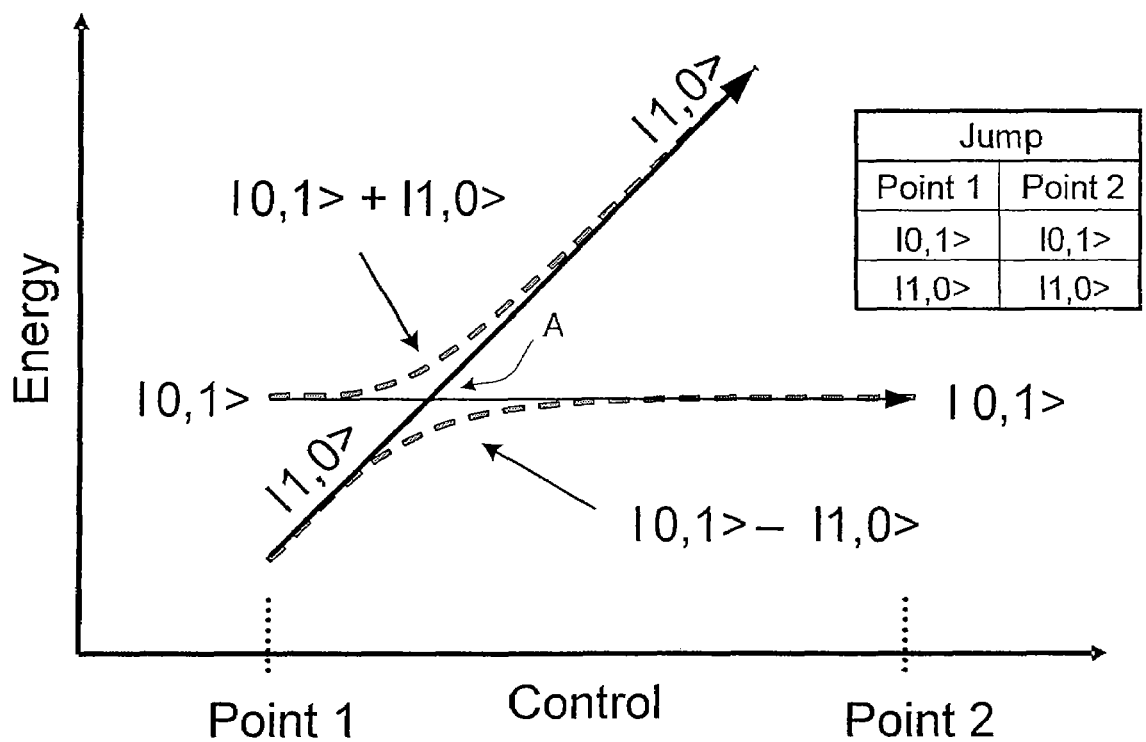
FIG. 3A is an energy diagram for the system of FIG. 2B, with truth table for qubit and resonator logic states, illustrating the concept of a fast jump between control points that preserves the state of the system.

FIG. 3A illustrates an energy diagram for a coupled qubit-resonator system, along with a truth table representing the logic states that correspond to information (e.g. photons) contained in the qubit and resonator. This diagram illustrates the preservation of quantum states when the transition of the classical control parameter between two control points is fast relative to the characteristic energy of the splitting. A fast transition such as this is called a jump operation.

The truth table in FIG. 3A shows the preservation of quantum states in a jump operation. In an initial state of |1,0> with the classical control parameter at Point 1, a rapid transition or jump of the control parameter through the avoided crossing causes no change in quantum state, preserving the |1,0> state of qubit and resonator at Point 2. Similarly, with the classical control parameter at Point 1 and with the qubit and resonator in an initial state of |0,1>, a jump through the avoided crossing at point A preserves the |0,1> state of the system at Point 2.

Figure 3B:
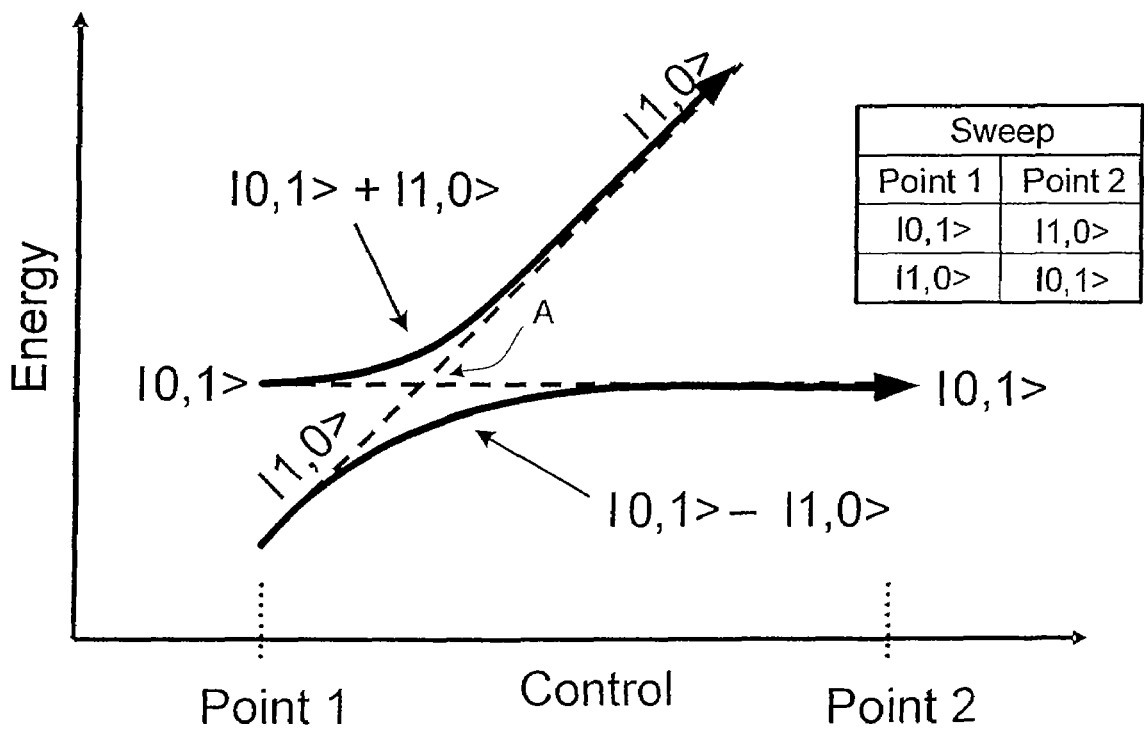
FIG. 3B is the energy diagram for the system of FIG. 2B, showing a truth table for qubit and resonator logic states, illustrating the concept of the adiabatic sweep.

FIG. 3B illustrates an energy diagram for a coupled qubit-resonator system, along with a truth table showing the logic states of the qubit and resonator in response to an adiabatic sweep, or sweep operation. The sweep operation avoids the crossing at point A by following the energy contours represented by the solid, curved lines. As shown in the truth table, the sweep operation swaps the initial and final states of qubit and resonator. For example, with the system initially at state |1,0>, a sweep of the classical control parameter from Point 1 to Point 2 results in a final state of |0,1>. With the system initially at state |0,1>, a sweep of the classical control parameter from Point 1 to Point 2 results in a final state of |1,0>.

The foregoing concepts of avoided crossing, jump operation, and sweep operation were presented in the context of a single energy crossing. With these concepts firmly in mind, the utility of the present invention is now disclosed in the context of a "full" energy diagram such as that depicted in FIG. 4A. This figure shows the first four energy levels of the coupled qubit-resonator system, as a function of the classical control parameter affecting the quantum state of the qubit. According to the invention, these four energy levels—|0,0>, |0,1>, |1,0>, and |1,1>—are used to manipulate the quantum information of multiple qubits, and thereby form the basis for a quantum logic circuit that may perform an arbitrary quantum operation.

Figures 4A, 4B:
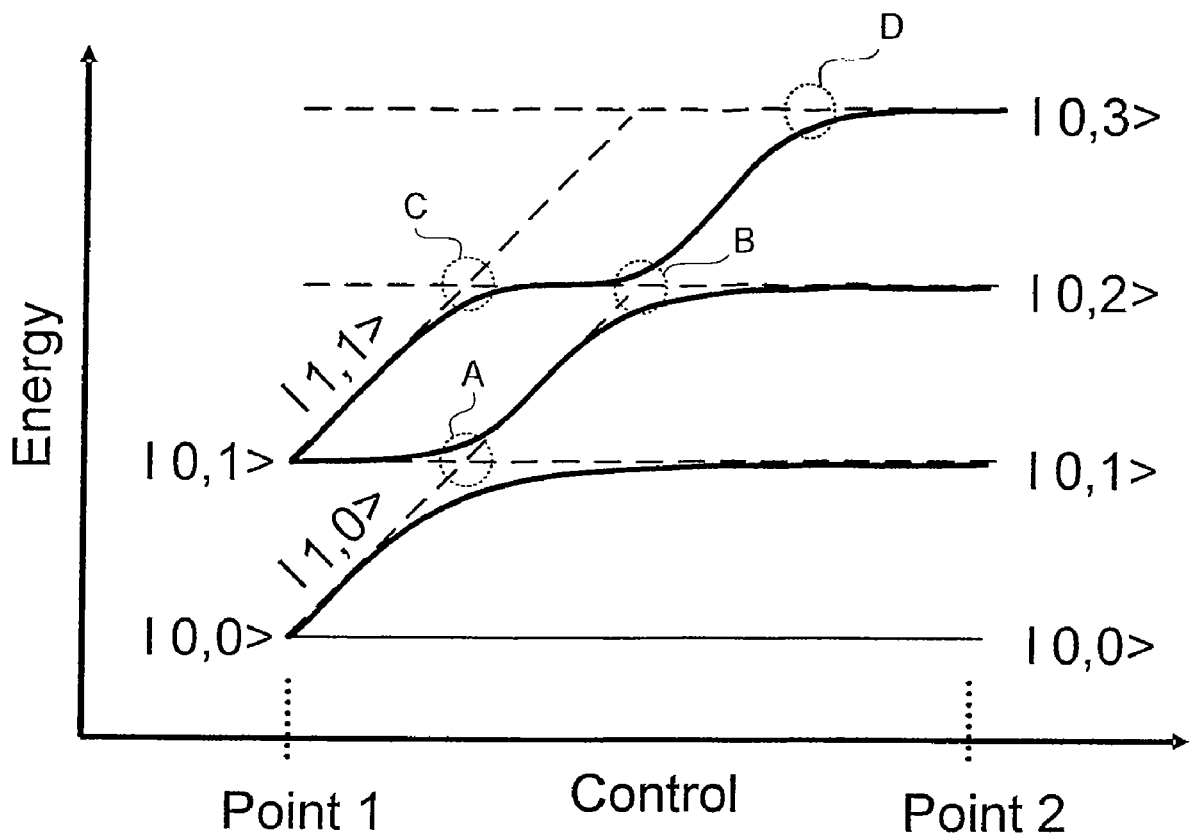
FIG. 4A is an energy diagram showing the first four energy levels of coupled qubit-resonator system changing states responsive to an adiabatic sweep using a classical control parameter according to the invention.
FIG. 4B is a truth table listing qubit and resonator states at each control point for the diagram of FIG. 4A.

FIG. 4A identifies four distinct regions of energy crossings, labeled A, B, C and D. By coupling qubits to a common resonator, each of these energy crossings is an avoided crossing. Therefore, an adiabatic sweep of the classical control parameter through any of these crossings will cause the system to exchange energy states as the energy level avoids the crossing and tracks one of the solid lines. Alternatively, a jump operation by the classical control parameter through any of the avoided crossings will preserve the state of the system as the energy level jumps an energy crossing along the path represented by one of the dashed lines. By manipulating the classical control parameter to combine sweep operations and jump operations in various sequences, different truth tables may be enabled according to the invention.

FIG. 4B illustrates one such truth table. This truth table represents all possible outcomes in the energy diagram of FIG. 4A, where the classical control parameter moves from Point 1 to Point 2 only by adiabatic sweep through the energy crossings. In this case, the system evolves by following the energy contours. For example, consider the qubit in an initial state at Point 1. If the resonator is in the |0> state, then an adiabatic sweep of the control line to Point 2 transfers the |0> and |1> states of the qubit into the |0> and |1> states of the resonator, respectively. However, if the resonator is in the |1> state, an adiabatic sweep to Point 2 transfers the |0> and |1> states of the qubit instead to the |2> and |3> states of the resonator. These results are summarized in the truth table of FIG. 4B, which indicates a one-to-one mapping of initial energy states of the system at Point 1 to the resulting energy states of the resonator at Point 2.

Figures 5A, 5B:
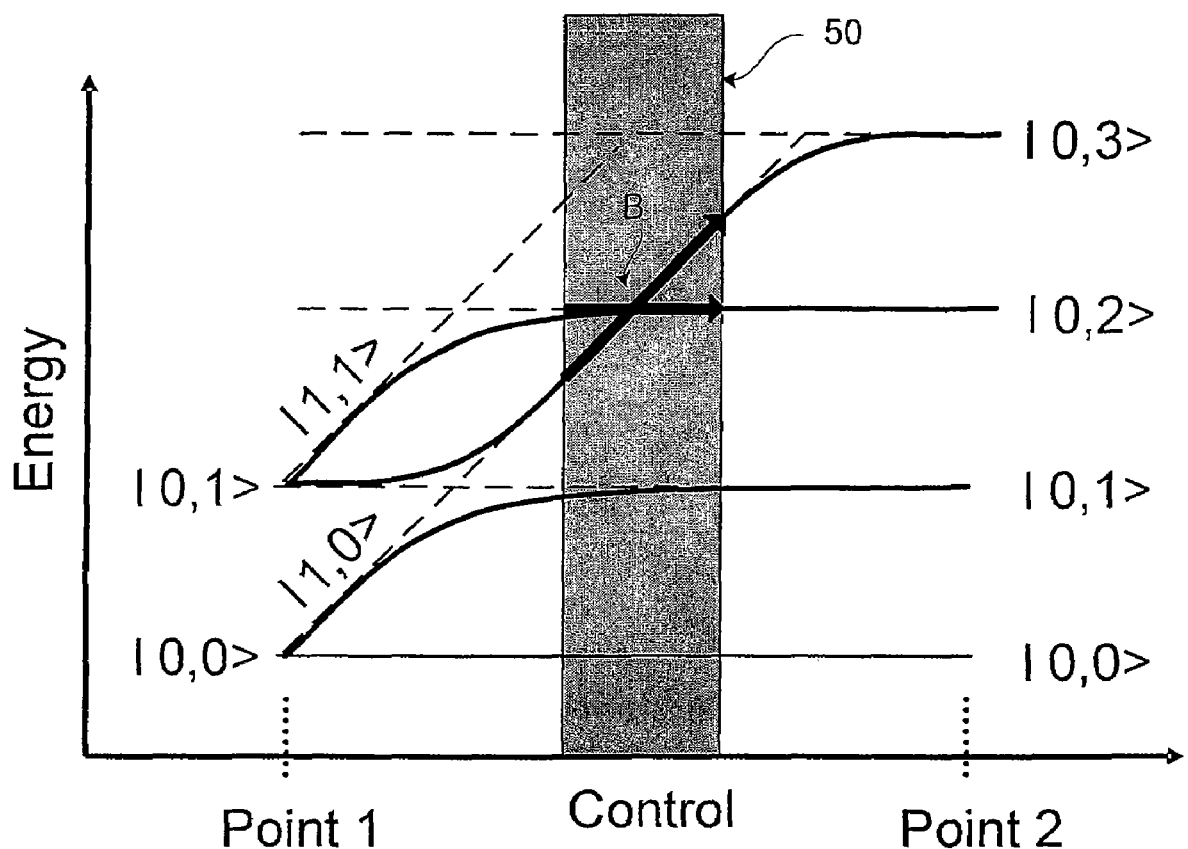
FIG. 5A is an energy diagram showing the first four energy levels of a coupled qubit-resonator system changing states responsive to a fast jump through an energy crossing (point B) using a classical control parameter according to the invention.
FIG. 5B is a truth table listing qubit and resonator states at each control point for the diagram of FIG. 5A

The energy diagram of FIG. 5A provides another example of a logical operation according to the invention. A truth table summarizing all possible outcomes of this operation is given in FIG. 5B. In this operation, the classical control parameter is ramped slowly (i.e. adiabatically) relative to the coupling for all energy crossings, except for the energy crossing B. In the vicinity of the energy crossing B, the classical control parameter applies a jump operation, in the area spanned by the shaded rectangle 50, to force a crossing through point B. In one practical embodiment, this intermediate jump operation may be achieved by engineering the shape of the control pulse for sufficient speed relative to the size of energy crossing B. In another embodiment, the strength of the coupling at crossing B may be engineered to be weaker than the other couplings, while the speed of the control pulse may remain constant. In another embodiment, some combination of control pulse variation and change in coupling strength may be engineered to achieve the desired jump. In any case, the quantum state jumps through crossing B, following the dashed-line path. The net result is that the |2> and |3> states of the resonator at Point 2 are swapped, as indicated by a comparison of the truth table of FIG. 5B to the truth table of FIG. 4B. Note that for the system of FIG. 5A, there is also a one-to-one mapping of initial energy states of the system at Point 1 to the resulting energy states of the resonator at Point 2.

Importantly, for the operations depicted in both FIG. 4A and FIG. 5A, quantum information is not lost. That is, either of these operations may be reversed for complete recovery of the information. It is this fact that allows creation of multiple-qubit logic gates according to the invention. In the embodiments that follow, all qubits are coupled to a single common (or shared) resonator. Also, in the following embodiments, it is assumed that the resonator starts in the ground state, although this is not required in order to practice the invention.

Figure 6:
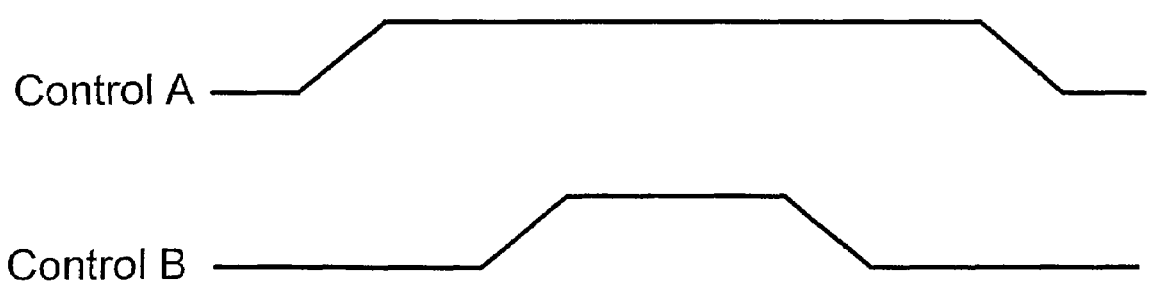
FIG. 6 is a truth table for a STORE operation achieved according to the invention employing two qubits coupled to a common resonator, and showing state changes corresponding to a sequence of control pulse sweeps.

FIG. 6 is a truth table illustrating how an elementary STORE operation may be achieved according to the invention using a quantum circuit having a two-qubit gate. The two qubits, qA and qB, are coupled to a common resonator. Each qubit qA and qB is tunable by a corresponding classical control parameter, where Control A corresponds to qubit qA and Control B corresponds to qubit qB. Energy state notation |qA qB>|r> is used to denote energy levels in qubit qA, qubit qB, and resonator r, respectively.

To achieve the STORE operation, Control A and Control B apply a sequence of control pulses to the qubits, as indicated by the waveforms shown in FIG. 6 below the truth table. An upward slope in a waveform represents a sweep from Point 1 to Point 2, and a downward slope in a waveform represents a sweep from Point 2 to Point 1.

The initial state of the system is shown in the first column of the truth table. Each of the remaining columns corresponds to the state resulting from the following sequence of control pulses: First, the control line of qubit qA is swept adiabatically from Point 1 to Point 2. Considering only qubit qA and ignoring qubit qB, this sweep transfers quantum information into the resonator as shown in the second column of the truth table in the same manner of transfer depicted in FIG. 4A. Then, the control line of qubit qB is swept adiabatically from Point 1 to Point 2. Ignoring qubit qA and considering only qubit qB, this sweep transfers quantum information into the resonator as shown in the third column of the truth table, also according to the manner of transfer depicted in FIG. 4A. The result of these two sweep operations is the transfer of the two-qubit states |0 0>, |0 1>, |1 0>, and |1 1> to the first four states |0>, |1>, |2>, and |3> of the resonator. Thus, quantum information is mapped into the resonator with no loss of information, by sweeping the control line of qubit qA from Point 1 to Point 2, then sweeping the control line of qubit qB from Point 1 to Point 2.

When the information needs to be placed back into qubits qA and qB, the reverse sequence of control pulses may be applied, as indicated in the control waveforms. First, the control line of qubit qB is swept adiabatically from Point 2 to Point 1. Then, the control line of qubit qA is swept adiabatically from Point 2 to Point 1. The resulting energy levels for each of these steps again follows the contours of FIG. 4A, as shown in the final two columns of the truth table. In this manner, a STORE operation may be realized whereby information in the two-qubit gate may be temporarily stored in the resonator, and later returned to the qubits.

Figure 7:
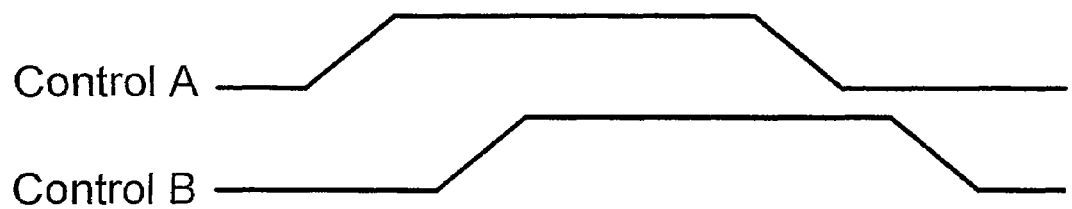
FIG. 7 is a truth table for a SWAP operation achieved according to the invention employing two qubits coupled to a common resonator, and showing state changes corresponding to another sequence of control pulse sweeps.

In another embodiment of the invention, a two-qubit gate may achieve a SWAP operation. This is depicted in FIG. 7, which shows a truth table for the SWAP operation and the corresponding control pulse waveforms. As in previous embodiments, this two-qubit gate consists of qubits qA and qB coupled to a common resonator, where each qubit is independently tunable by a corresponding classical control parameter Control A or Control B. Reading from left to right, the first three columns of the truth table are achieved identically as in the embodiment of FIG. 6.

In the SWAP operation, however, information is retrieved in the same order it was put in. That means that after sweeping Control B from Point 1 to Point 2, the next step is an adiabatic sweep of Control A from Point 2 to Point 1, followed by an adiabatic sweep of Control B from Point 2 to Point 1. The effect of these sweeps is shown in the truth table in the fourth and fifth columns, respectively. The result of this sequence is that the quantum state stored in qubit qA is swapped with the quantum state stored in qubit qB. An important feature is that since more than two qubits can be coupled to the same resonator, this allows for the realization of more complicated circuits according to the invention, such as a quantum shift register. For example, the state in qubit qA may be swapped to qubit qB, which in turn may be swapped to a third qubit qC, etc.

In the foregoing embodiments that achieve the STORE and SWAP operations, adjustment of the classical control parameter between any two control points was effected only by means of an adiabatic sweep. That is, the control flux, DC bias current, or other control parameter was changed slowly with respect to the size of the coupling between the qubits and the resonator. In a two-qubit circuit where the qubits are coupled to a common resonator and tunable by classical control parameters, a logical CNOT operation may be achieved by combining sweep operations as described in FIG. 4A with at least one jump operation as described in FIG. 5A.

Figure 8:
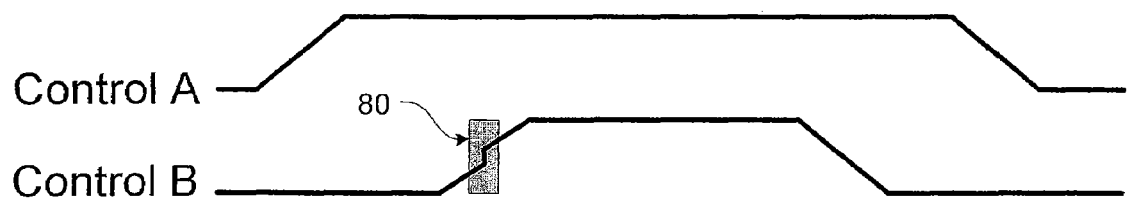
FIG. 8 is a truth table for a CNOT operation achieved according to the invention employing two qubits coupled to a common resonator, and showing state changes corresponding to a combination of control pulse sweep and jump operations.

FIG. 8 is a truth table for a CNOT operation according to the invention, showing state changes corresponding to a combination of control pulse sweep and jump operations. The waveforms corresponding to adjustment of classical control parameters Control A and Control B are shown below the truth table.

The first pulse in the sequence of pulses in FIG. 8 is identical to that of FIG. 6, wherein quantum information in qubit qA is transferred to the resonator by an adiabatic sweep of Control A from control Point 1 to control Point 2. The second pulse in the sequence, however, is a jump operation applied by Control B, as indicated in shaded location 80. When information in qubit qB is transferred into the resonator, crossing B in FIG. 5A is jumped over, modifying the truth table of FIG. 8 according to the pattern of FIG. 5A, as shown in the third column under "qB Jump". The next control pulse in the sequence is an adiabatic sweep of Control B from Point 2 to Point 1, followed by an adiabatic sweep of Control A from Point 2 to Point 1. These sweeps alter the truth table according to the pattern of FIG. 4A.

The end result of this sequence is shown in the final column of the truth table of FIG. 8. As shown, the state of qubit qA controls whether or not the state in qubit qB is flipped. If qubit qA is one, qubit qB is flipped. If qubit qA is zero, qubit qB is not flipped. This is precisely the truth table of a CNOT operation.

Figure 9:
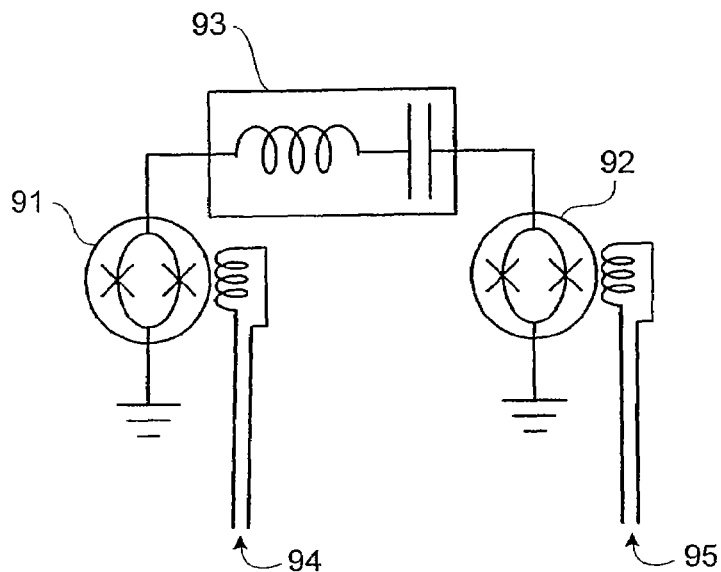
FIG. 9 is a block diagram of a quantum circuit according to the invention having multiple qubits coupled to a common resonator for performing an arbitrary logical operation.

A more specific implementation example of a system according to the invention is shown in the block diagram of FIG. 9 as a quantum circuit 90. Circuit 90 includes two qubits, 91 and 92, each coupled to a common resonator 93, and each controllable by respective classical digital controls 94 and 95. Qubits 91 and 92 may correspond to qubits qA and qB described in the foregoing embodiments. Circuit 90 may therefore function as a fundamental quantum gate for performing SWAP or CNOT operations, depending on how controls 94 and 95 are manipulated. Thus circuit 90, either alone or in some combination with similar gates, may perform an arbitrary logical operation according to the invention. In this embodiment, qubits 91 and 92 are each modeled as a DC SQUID, resonator 93 is modeled as a series LC circuit or LC circuit component, and controls 94 and 95 are each modeled as an electrical circuit magnetically coupled to a respective qubit, each providing a flux bias as a means of control. The flux bias may be created in response to another control signal elsewhere in the computer system. For example, in response to a classical computer processor executing an algorithm stored in a classical computer memory, a transistor or other classical electronic device may change state to energize control circuit 94 or 95. Herein, a classical computer memory means any conventional processor-readable or computer-readable memory, such as a hard disk, flash memory, or other magnetic or optical storage device.

Throughout the foregoing disclosure, various methods according to the invention for creating quantum logic gates are implied. The following embodiments are provided to expressly illustrate methods for implementing quantum logic operations according to the invention. These methods may be embodied, in whole or in part, as processing steps stored in a classical computer memory and executable by a classical computer processor for manipulating a quantum circuit according to the invention, for example, according to a process as described in the previous paragraph.

Figure 10:
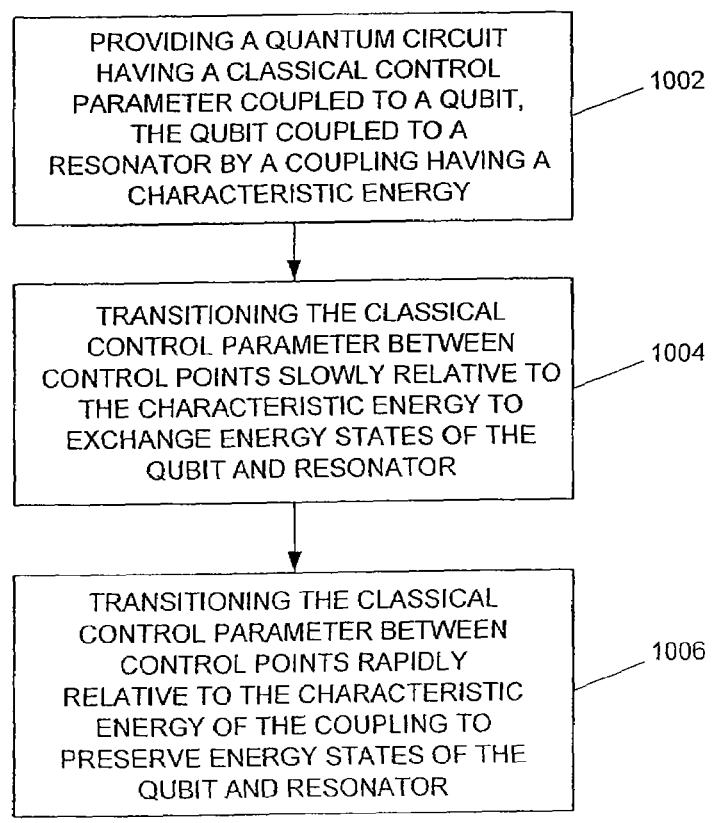
FIG. 10 is a flow diagram illustrating an embodiment of a method according to the invention for creating a quantum logic gate.

The first of these methods is method 1000 shown in FIG. 10. Method 1000 begins with an initial step 1002, which provides a quantum circuit having a classical control parameter coupled to a qubit, wherein the qubit is coupled to a resonator by a coupling having a characteristic energy. This step is followed by step 1004, in which the classical control parameter is transitioned between control points, e.g. Point 1 and Point 2, slowly relative to the characteristic energy of the coupling to cause an exchange of energy states between the qubit and the resonator. In the final step 1006, the classical control parameter is transitioned between the control points rapidly relative to the characteristic energy of the coupling to preserve the energy states of the qubit and resonator. The sequence of steps 1004 and 1006 may be reversed, to achieve a desired quantum operation.

Figure 11:
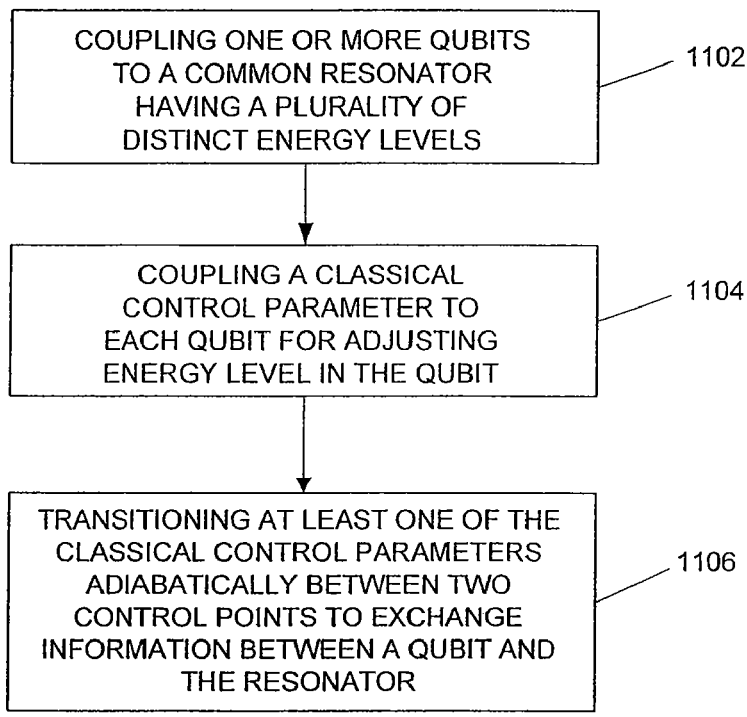
FIG. 11 is a flow diagram illustrating an embodiment of a method according to the invention for performing a quantum gate operation.

Another embodiment of a method according to the invention is method 1100 shown in the flow diagram of FIG. 11. In the first step 1102, one or more qubits are coupled to a common resonator. A requirement of this step is that the resonator have a plurality of distinct energy levels. In the next step 1104, a classical control parameter is coupled to each qubit in a manner that allows for adjustment of the energy level in the qubit in response to a digital change in the classical control. In this step, each qubit is coupled to one and only one classical control. In the final step 1104, at least one of the classical control parameters is transitioned adiabatically between two control points to exchange information between a qubit and the resonator.

Figure 12:
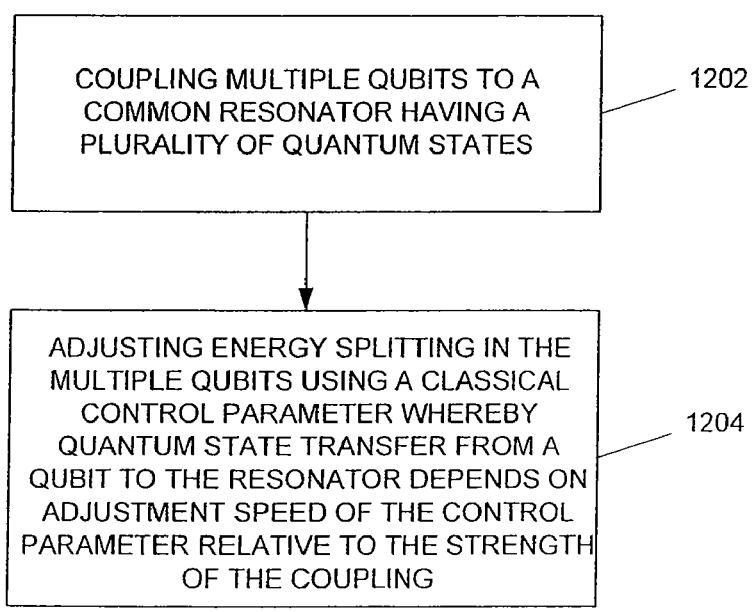
FIG. 12 is a flow diagram illustrating another embodiment of a method according to the invention for creating a quantum logic gate.

Another method according to the invention is method 1200 illustrated in the flow diagram of FIG. 12. Method 1200 begins with an initial step 1202, in which multiple qubits are coupled to a common resonator, the resonator having a plurality of quantum states. In one implementation, the resonator has four quantum states. In the next and final step 1204, energy splitting in the multiple qubits is adjusted using a classical control parameter adjustable between first and second control points. In this step, energy state transfer from a qubit to the common resonator depends on adjustment speed of the control parameter between the control points, relative to the strength of the coupling.

By carefully controlling the energy splitting in two qubits coupled to a common resonator, a method according to the invention may achieve a CNOT operation on a quantum scale. When combined with single qubit operations known in the art, this invention makes possible a complete set of quantum gates. Every multiple qubit operation may be decomposed into a string of control pulses to multiple qubits coupled to a common resonator. Thus, in a quantum circuit according to the invention, the changes in energy states may provide logic gates comprising a quantum computer, enabling all possible quantum calculations by detection of state changes in a qubit or resonator.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A fundamental logic gate, comprising:
   a first qubit controlled by a first classical control parameter, the first qubit having a plurality of energy states;
   a second qubit controlled by a second classical control parameter, the second qubit having a plurality of energy states;
   a common resonator in communication with each of the first qubit and the second qubit;
   wherein the first classical control parameter transitions the first qubit slowly relative to the characteristic energy to exchange information between the first qubit and the common resonator.

2. The fundamental logic gate of claim 1, wherein the second classical control parameter transitions the second qubit rapidly relative to the characteristic energy to preserve quantum state of the qubit and the resonator.

3. The fundamental logic of claim 1, wherein the second classical control parameter transitions the second input qubit slowly relative to the characteristic energy to exchange information between the second qubit and the common resonator.

4. The fundamental logic gate of claim 1, wherein the first qubit is one of a Josephson junction, a superconducting qubit, a superconducting flux qubit or s superconducting charge qubit.

5. The fundamental logic gate of claim 1, wherein the first qubit is one of a Josephson junction, a superconducting qubit, a superconducting flux qubit or a superconducting charge qubit.

6. The fundamental logic gate of claim 1, wherein the second qubit is one of a Josephson junction, a superconducting qubit, a superconducting flux qubit or a superconducting charge qubit.

7. The fundamental logic gate of claim 1, wherein the first classical control parameter is selected from the group consisting of a DC current, a flux bias and a charge bias.

8. The fundamental logic gate of claim 1, wherein the resonator is selected from the group consisting of a transmission line, a resonant cavity and a third qubit.

9. The fundamental logic gate of claim 1, wherein the transition between the first qubit and the common resonator is reversible.

10. A quantum logic shift register, comprising:
a Josephson junctions defining a qubit;
a resonator coupled to the qubit;
a classical control parameter for controlling the energy state of the qubit, the classical control parameter transitioning the energy level between the qubit and the resonator where each of the resonator and the first qubit are at an initial energy state;
wherein a slow energy transition between the qubit and the resonator transfers energy from the qubit to the resonator and a rapid energy transition between the qubit and the resonator preserves the initial quantum states of each of the qubit and the resonator.

11. The quantum logic shift register of claim 10, wherein a transition is defined relative to the characteristic energy of the coupling between the qubit and the resonator.

12. A method for forming a quantum logic gate, the method comprising:
coupling a first qubit and a second qubit to a common resonator, each of the first qubit and the second qubit having a plurality of energy states;
controlling energy transfer between the first qubit and the common resonator by transitioning a classical control parameter adiabatically;
controlling energy transfer between the second qubit and the common resonator by transitioning the classical control parameter rapidly relative to the characteristic energy of the logic gate to preserve the quantum states of the qubit and the resonator.

13. The method of claim 12, wherein the step of transitioning a classical control parameter adiabatically defines a slow transition relative to the characteristic energy of the logic gate.

14. The method of claim 12, wherein the first classical control parameter is selected from the group consisting of a DC current, a flux bias and a charge bias.

15. The method of claim 12, wherein the common resonator is selected from the group consisting of a transmission line, a resonant cavity and a third qubit.

16. The method of claim 12, wherein the transition between the first qubit and the common resonator is reversible.

17. The method of claim 12, wherein the first qubit is one of a Josephson junction, a superconducting qubit, a superconducting flux qubit or s superconducting charge qubit.

18. The method of claim 12, wherein the second qubit is one of a Josephson junction, a superconducting qubit, a superconducting flux qubit or s superconducting charge qubit.

* * * * *